United States Patent
Mazur et al.

(10) Patent No.: US 6,438,115 B1
(45) Date of Patent: Aug. 20, 2002

(54) HIGH SPEED DATA COMMUNICATION SYSTEM AND METHOD

(75) Inventors: Sara Mazur, Bromma; Johan Molnö, Stockholm; Christofer Lindheimer, Kista, all of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/263,950

(22) Filed: Mar. 8, 1999

(51) Int. Cl.[7] .......................... H04B 7/216; H04Q 7/20
(52) U.S. Cl. ...................... 370/330; 370/335; 370/337; 370/347; 455/447; 455/450; 455/452
(58) Field of Search .................. 455/447, 450, 455/452, 442, 502, 422, 466, 562, 403, 456, 25, 438; 370/330, 335, 347, 337, 280, 281; 375/132, 133, 135, 136, 200, 354, 355, 356

(56) References Cited

U.S. PATENT DOCUMENTS

| | | | |
|---|---|---|---|
| 5,111,534 A | * 5/1992 | Benner | 455/447 |
| 5,230,082 A | * 7/1993 | Ghisler et al. | 455/450 |
| 5,570,352 A | 10/1996 | Pöyhönen | 370/18 |
| 5,579,306 A | * 11/1996 | Dent | 370/330 |
| 5,594,720 A | * 1/1997 | Papadopoulos et al. | 370/330 |
| 5,732,076 A | 3/1998 | Ketseoglou et al. | 370/347 |
| 5,774,790 A | 6/1998 | Dupuy | 455/33.1 |
| 6,256,486 B1 | * 7/2001 | Barany et al. | 455/450 |
| 6,259,685 B1 | * 7/2001 | Rinne et al. | 370/330 |

FOREIGN PATENT DOCUMENTS

| | | | |
|---|---|---|---|
| WO | WO97/12489 | * | 4/1997 |
| WO | WO98/31110 | * | 7/1998 |

OTHER PUBLICATIONS

Katzela et al. "Channel Assignment Schemes for Cellular Mobile Telecommunication Systems: A Comprehensive Survey" !EEE 'Personal Communication 1996', pp. 10–31.*

* cited by examiner

Primary Examiner—Alpus H. Hsu
Assistant Examiner—Afsar M. Qureshi
(74) Attorney, Agent, or Firm—Burns, Doane, Swecker & Mathis, L.L.P.

(57) ABSTRACT

A system and method for a synchronized packet data communication system is described. Briefly control channels are transmitted in a reuse pattern defined by both frequency and timeslot division. Each timeslot division is such that different timeslot groups included in the repetition pattern are separated by at least one timeslot. No traffic data transmissions occur simultaneous to the control channel transmissions. Furthermore, a synchronization channel is introduced to be transmitted on the same physical channel as other packet common control channels.

12 Claims, 8 Drawing Sheets

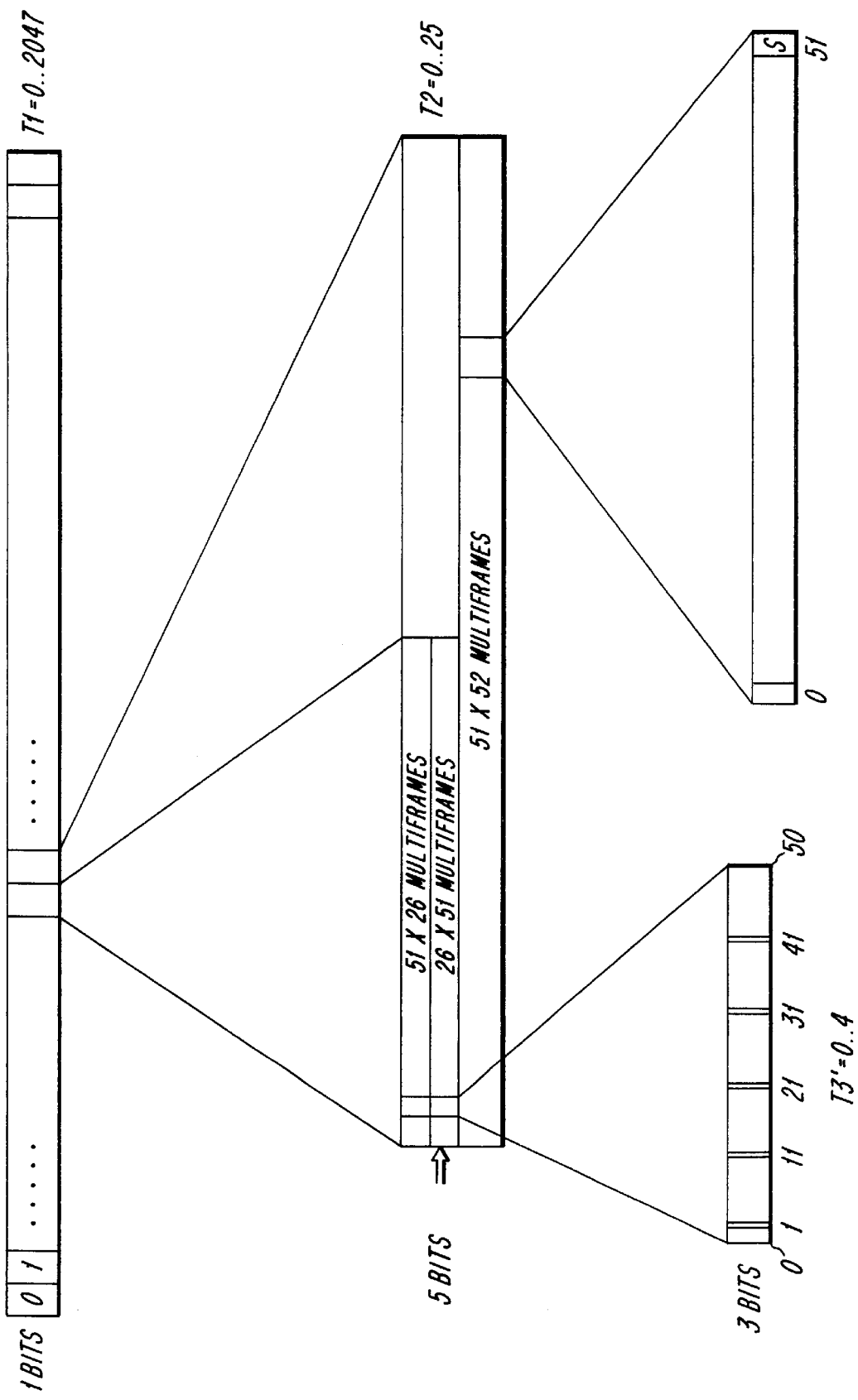

PRESENT SOLUTION

SUGGESTED SOLUTION

101 SIGNALS 52 MULTI FRAMES ONLY USED

HIGH SPEED DATA COMMUNICATION SYSTEM AND METHOD

BACKGROUND OF THE INVENTION

The present invention relates generally to cellular and wireless communication and more particularly to a system and method for communicating control and user information in a cellular packet data communication system Recently, there has been a trend in the telecommunication community to focus more and more on wireless packet data communication rather than circuit switched voice communication. With the tremendous increase of Internet users, it is believed that the packet switched communication will soon increase more and become, larger than the circuit switched voice communication that today dominates the e.g., the cellular communication. Cellular communication system manufacturers and operators are therefore looking for solutions to integrate their circuit switched services with wireless packet switched services that can provide reliable and more spectrum efficient connections for packet switched users, e.g., Internet users. This trend has made different types of packet switched communication system evolutions flourish. One of the more well known packet switched cellular systems in the telecommunications community, even though it is not yet launched, is the extension of the present GSM cellular communication system, called GPRS (General Packet Radio Services).

GPRS is a packet switched system that uses the same physical carrier as the present GSM cellular communication system and is designed to coexist and provide the same coverage as GSM. GPRS radio interface is thus based on a TDMA structured system with 200 kHz carriers divided into eight timeslots with GMSK (Gaussian Minimum Shift Keying) modulation. The multiplexing is such that each timeslot can typically serve a number of users and one user can also be allocated more than one timeslot to increase its user throughput of data over the air. The GPRS specification includes a number of different coding schemes to be used dependent on the quality of the radio carrier. with GPRS, data rates well over 100 kbps will be possible.

Recently there has also been a development and standardization effort to further increase the data throughput to GPRS, by introducing a higher level modulation than what is used for GSM and GPRS, i.e., GMSK. The enhancement of GPRS is called EGPRS (Enhanced GPRS) and employs an 8PSK (8 Phase Shift Keying) modulation format which will increase the data rates to over 384 kbps. Additional coding schemes are developed for this 8PSK that will make an efficient link adaptation possible. Link adaptation is a functionality that allows adaptation in terms of coding and modulation with respect to present signal quality. In poor radio conditions, a robust coding and GMSK modulation is selected whereas in good radio Conditions, a less robust coding and 8PSK modulation is used. GPRS (and the extensions thereof, also has a backward error correction functionality in that it can request retransmissions of erroneously received blocks. This mechanism is called ARQ (Automatic Repeat reQuest) and is a well known mechanism in the art.

The GPRS is thus developed with the aim to introduce packet switched access in GSM system environments. Even though some features are duplicated for GPRS, e.g., specific packet control channels are defined, it is still dependent upon the existence of GSM circuit switched control channels.

For example GPRS may have its own Packet Broadcast Channels (PBCCH) and Packet Paging Channels (PPCH) but for cell reselection purposes, it is still dependent on listening to a GSM broadcast carrier. The reason for this is that a GPRS system does not provide any synchronization burst or frequency correction burst on the physical channels that carry the packet control channels, as presently standardized. This means that a GPRS system cannot exist by itself, it is dependent upon a GSM circuit switched control channel.

There is thus a problem today, to be able to run a stand-alone GPRS system without having to also implement a circuit switched mode, Recent development for another TDMA based cellular system, the cellular communication system compliant to the IS-136 standard, below referred to as TDMA/136 has indicated a need for a high throughput packet data system to be integrated with the TDMA/136 circuit switched mode. Several companies in the telecommunication industry have come to an agreement that a high-speed packet switched mode in a TDMA/136 system could be based on GPRS and the extensions thereof. This will allow for possibilities of providing bit rates up to 384 <bps on 200 kHz carriers with GMSK and 8PSK modulation, like that of GSM/GPRS.

This integration does not, however, come without a cost. First and foremost, the TDMA/136 carriers have a bandwidth of only 30 kHz, to be compared with GSM/GPRS carriers of 200 kHz. This means that operators that want to introduce GPRS have to allocate 200 kHz for each GPRS carrier. Adding that some frequency reuse is needed for providing coverage and for limiting co-channel interference, this means that a TDMA/136 operator have to allocate a substantial amount of spectrum and thereby allocate bandwidth to GPRS that could otherwise be used for 30 kHz circuit switched channels. This has put requirements on the implementation of GPRS on 200 kHz carriers in TDMA/136 system. It should be possible to introduce GPRS within a bandwidth requirement below 1 MHz. Taking possible frequency reuse patterns and guard bands between 30 kHz carriers and 200 kHz carriers into consideration, this means that a 1/3 frequency reuse pattern must be deployed. A 1/3 frequency reuse pattern means, e.g., that all base station sites transmit in three sectors and with a different set of physical channels in each sector.

A physical channel can be a frequency or a timeslot or a combination thereof. Of course, if other systems than TDMA systems are considered, e.g., CDMA systems, a physical channel can also include combinations of a certain code pattern. Logical channels can be transmitted on one or more physical channels. A logical channel is defined by its content, e.g., control channels, traffic channels, broadcast channels etc.

Reuse patterns are introduced in cellular systems such that one can reuse the same frequencies in different cells. This should typically be done in a way such that the co-channel interference caused by base stations transmitting on the same frequency in closely located cells is limited. The higher the reuse, the better the carrier to interference ratio for an exemplary condition. A 1/3 reuse is illustrated in FIG. 1.

GPRS channels typically have different levels of robustness depending on the type of logical channel being transmitted. In a packet data system, reliance on retransmission possibilities can allow a quite high error rate and at least for this reason, the reuse for user data traffic channels can be kept quite low. A data traffic channel can be deployed in a 1/3 reuse whereas packet common control channels are not robust enough to be allocated in a 1/3 reuse, since the same retransmission possibilities are not used for these channels. A 3/9 reuse is recommended for packet data control channels. A 3/9 reuse means that there are 9 different sets of physical channels divided over three base station sites, where each site transmit in three sectors.

Considering the spectrum requirement of 1 MHz and a possible reuse requirement of 3/9 for packet common control channels, it is not possible, by just dividing the physical channels into different frequencies, to achieve such a reuse pattern. Only three-four 200 kHz frequencies can be allocated on 1 MHz, since some 2×100 kHz are needed as guard band between different types of carriers, e.g., 30 and 200 kHz carriers. Therefore, some other strategy is needed.

In patent application document WO 97/12489 with Pacific Communication Sciences Inc. as assignee is described a time sharing method and apparatus for frequency reuse in cellular communication systems. Frequency reuse is enhanced by synchronizing cell transmit/receive base stations in a cellular system to a common time base, an then sharing the available frequencies via allocated time sits.

In patent application document WO 98/31110 with Nokia Telecommunications as assignee, a method for improving system capacity is described. Nearby base stations using the same carrier do not send a broadcast time slot substantially simultaneously.

There are ways to increase a reuse pattern without having to allocate a higher frequency reuse. In a synchronized system, an overlaid timeslot reuse is also possible. The WO 98/31110 application is about broadcast messages in a circuit switched communication system.

It is found that the techniques described in these patent applications can be substantially improved to ensure control signalling message arrival in a receiving radio station and that additional actions can be taken in a synchronized system to ensure reliable reception of control signalling messages.

There are thus possibilities, in a further improved solution, to receive control signalling in a system that employs a lower frequency reuse than what is required by the control channels to be transmitted therein.

In another aspect it is to be noted that to be able to introduce 200 kHz GPRS carriers with 8PSK and GMSK modulation in a TDMA/136 system, the GPRS functionality that relies on a GSM control channel needs to be considered. It will not necessarily be the case that a GSM control channel is desired in a TDMA/136 system, since this system may not have a GSM circuit switched mode at all. As mentioned above, the channels that are necessary for a GPRS system, but transmitted in a GSM circuit switched mode, are the synchronization channel (SCH) and the Frequency Correction channel (FCCH) in GSM. GPRS systems rely on the capability of listening to this information. Therefore, it would be advantageous with a method for introducing synchronization and frequency correction possibilities in a GPRS system without also having to implement GSM circuit switched mode and the control channels associated therewith.

SUMMARY OF THE INVENTION

In one aspect of the present invention, a method and system is described, that can handle the above described deficiencies and provide a sufficient reuse pattern by introducing additional requirements on the control channel allocation. This method is based on a timeslot and frequency reuse in a base station synchronized system, such that a base station site is allocated certain timeslot or timeslots, herefrom called time group, on a frequency for control channel allocation. In another base. station site, using the same frequency, a different time group is allocated, such that the control channels are not allocated at the same time in closely located base station sites. In addition, to be able to handle propagation delays, different time groups do not include timeslots adjacent to a different time group. There is thus a minimum of one timeslot between two time groups to be able to handle propagation delays and avoid overlap of control channel symbols from different time groups.

In another aspect of the present invention, a first base station site that is allocated a certain frequency and time group to transmit control channel messages on the timeslots included in the time group. A second base station site is allocated the same frequency and another time group and could in theory transmit non-control channel messages on the timeslots coinciding with the first base station site's control channel allocated time group. In this aspect of the present invention, no transmission occurs in the timeslots coinciding with the first base stations time group for control channels. This improvement will ensure a more reliable reception of control channel signalling in all base station sites In yet another aspect of the present invention, a synchronization channel is introduced in a set of packet common control channels, such that, in that respect, a system compliant to the GPRS specification will not be dependent upon the implementation of a GSM circuit switched control channel. To be able to distinguish this new synchronization channel from the synchronization channel used in circuit switched GSM, a new coding is suggested. This new coding will allow a receiving unit to distinguish between different types of synchronization channels by reading a specific bit pattern value that are not present in the existing synchronization channel in circuit switched GSM.

BRIEF DESCRIPTION OF THE DRAWINGS

The invention will now be more thoroughly described and references will be made to the accompanying figures, of which:

FIG. 5a illustrates coding of a Synchronization Channel.

DETAILED DESCRIPTION

Figure 1:
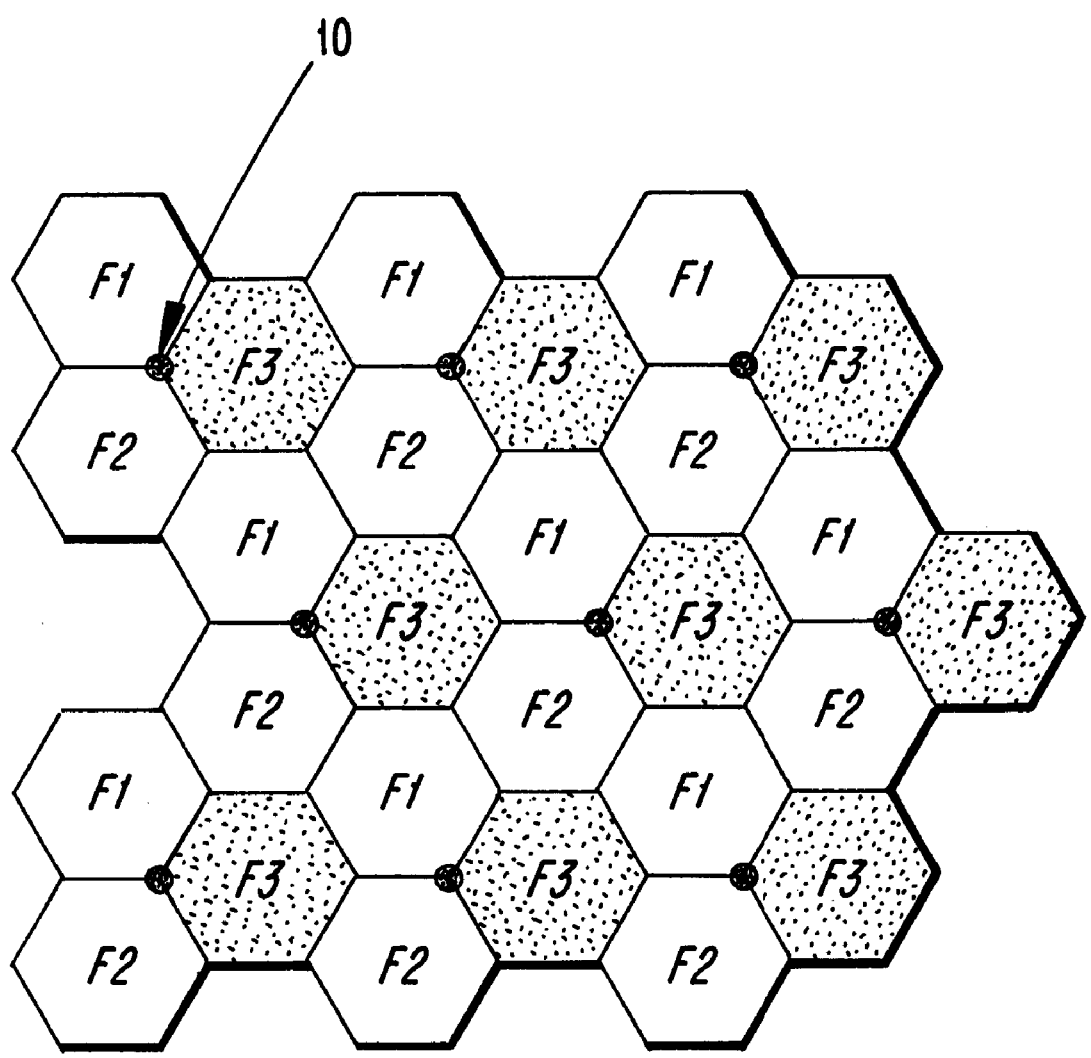
FIG. 1 illustrates a cellular pattern of a 1/3 frequency reuse.

The present invention will now be described in terms of specific embodiments for a TDMA packet switched communication system compliant to the GPRS standard specification.

In a typical packet data communication system employing Time Division Multiple Access (TDMA), the physical channels on which communication can occur are divided into timeslots on a physical carrier. In the GSM and GPRS cellular communication system, each carrier frequency is divided into eight timeslots, or eight physical channels. Eight consecutive physical channels are called a TDMA frame. There are typically different types of repetition cycles in the TDMA structure, such that e.g., certain control signalling and broadcast messages should take place a certain number of times within such repetition cycles. In the GPRS specification, one important repetition cycle is a 52 multiframe. This 52 multiframe form the basis of how many physical channels that should be allocated for different logical channels, e.g., Packet Data Traffic Channels (PDTCH), Packet Broadcast Channels (PBCCH), Packet Paging Channels (PPCH) and Packet Access Grant Channels (PAGCH). The 52 multiframe structure is used as soon as there are possibilities to allocate PDTCHs on the same timeslot. GPRS further divide each timeslot in the 52 multiframe into 12 blocks with 4 TDMA frames in each, 2 idle TDMA frames and 2 frames used for Packet Timing Advance Control Channel Signalling (PTCCH), total 4*12+2+2=52 TDMA frames. The GPRS frame structure and block allocation of logical channels is further described in ETSI TS 100 908 v.6.2.0 Digital Cellular Communication System (Phase 2+); "Multiplexing and multiple access on the radio path" (GSM 05.02 version 6.2.0 Release 1997), hereby incorporated by reference.

When GPRS is to be introduced in TDMA/136 systems, it would be advantageous to limit the amount of interworking functionality between the different system modes and the different physical carriers, for TDMA/136, 30 kHz (Differential Quartemary Phase Shift Keying) DQPSK modulated carriers and for GPRS, 200 kHz carriers. By interworking functionality is meant that one of the system modes (system modes are TDMA/136 circuit switched mode and GPRS packet switched mode) have to handle functionality that relates more to the other system mode, e.g., circuit switched paging of mobiles in packet switched mode. Such interworking functionality can be that which GPRS relies on, supported today by GSM circuit switched control channels, e.g., frame synchronization. The more limited the interworking is, the easier will the implementation of the GPRS mode in TDMA/136 be. Also, if the most important functionality can be handled in the GPRS mode itself, it will be possible to support users that do not have any TDMA/136 capability with packet switched communication also in the TDMA/136-GPRS system. Further possibilities to launch pure GPRS systems can also be considered.

The requirement of TDMA/136 GPRS migration with 1 MHz of spectrum for the GPRS 200 kHz carriers however, put additional difficulties to the control channel introduction on 200 kHz. As discussed above, the packet common control channels must have a reuse that is higher than 1/3, which is the possible frequency reuse satisfying the bandwidth requirement of 1 MHz. It would be advantageous to be able to have packet control channels on 200 kHz, since otherwise, the TDMA/136 mode has to be redefined to also support packet control on 30 kHz carriers.

Figure 2:
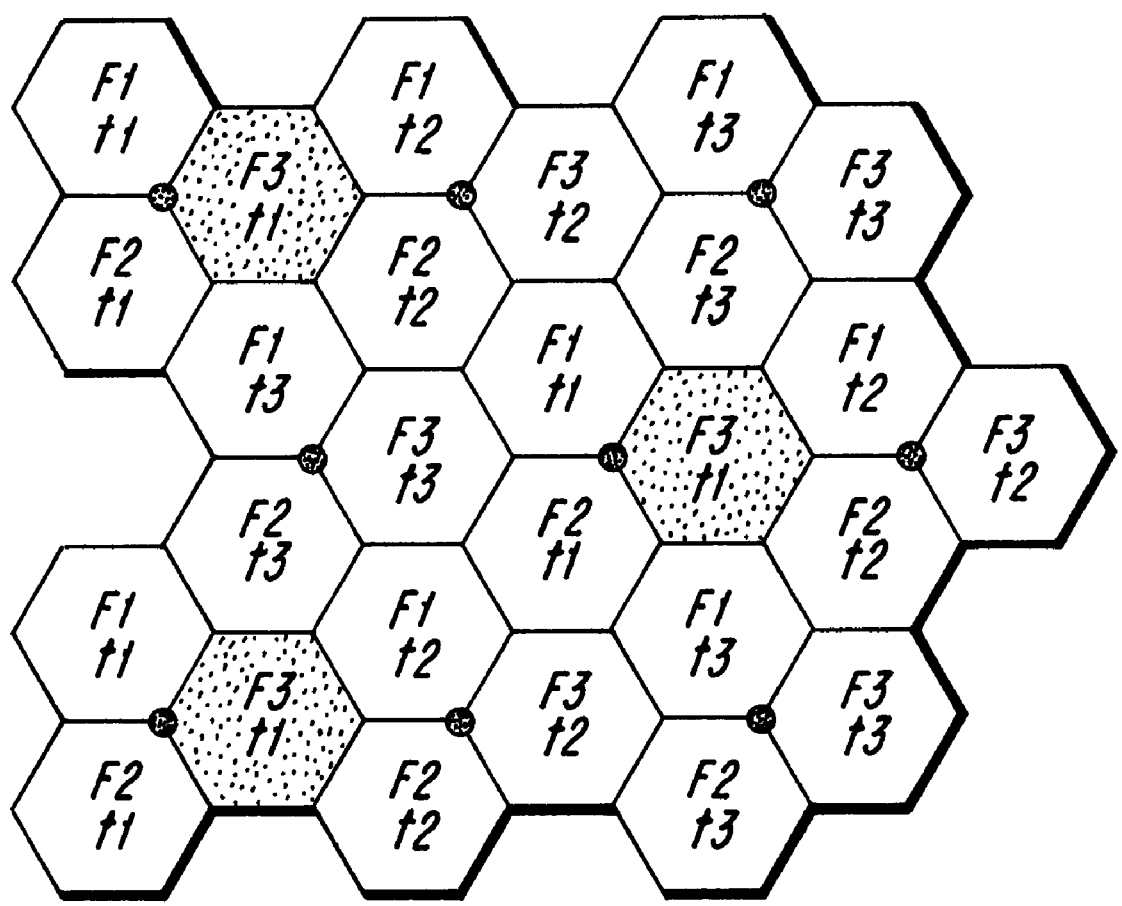
FIG. 2 illustrates a cellular pattern of a 1/3 frequency reuse with an overlaid 1/3 timeslot reuse, creating an effective 3/9 time-frequency reuse.

One step towards a "self-sufficient" GPRS system that does not rely on the TDMA/136 mode for its functionality is to allow packet common contro channels as defined for GPRS and transmit packet common control information on 200 kHz carriers. This can be done in a system where 200 kHz carriers are time synchronized from different base stations. This time synchronization can be done in a number of different ways, e.g., by way of GPS (Global Positioning System) receivers in the base station sites, such that a common time reference is achieved. The time synchronization means that a mobile station camping in one cell automatically knows the frame structure of neighboring cells. If different timeslots are used to allocate packet common control channels in different cells, then the actual reuse of for the packet common control signalling can be made higher than the actual frequency reuse. In FIG. 2 is illustrated an exemplary frequency and time reuse pattern according to one embodiment of the present invention. Therein frequencies are repeated in a 1/3 reuse, and an overlaying repetition of timeslots, also n a 1/3 reuse generate an effective 3/9 reuse for the timeslots that are used for the packet common control signalling.

Figure 3:
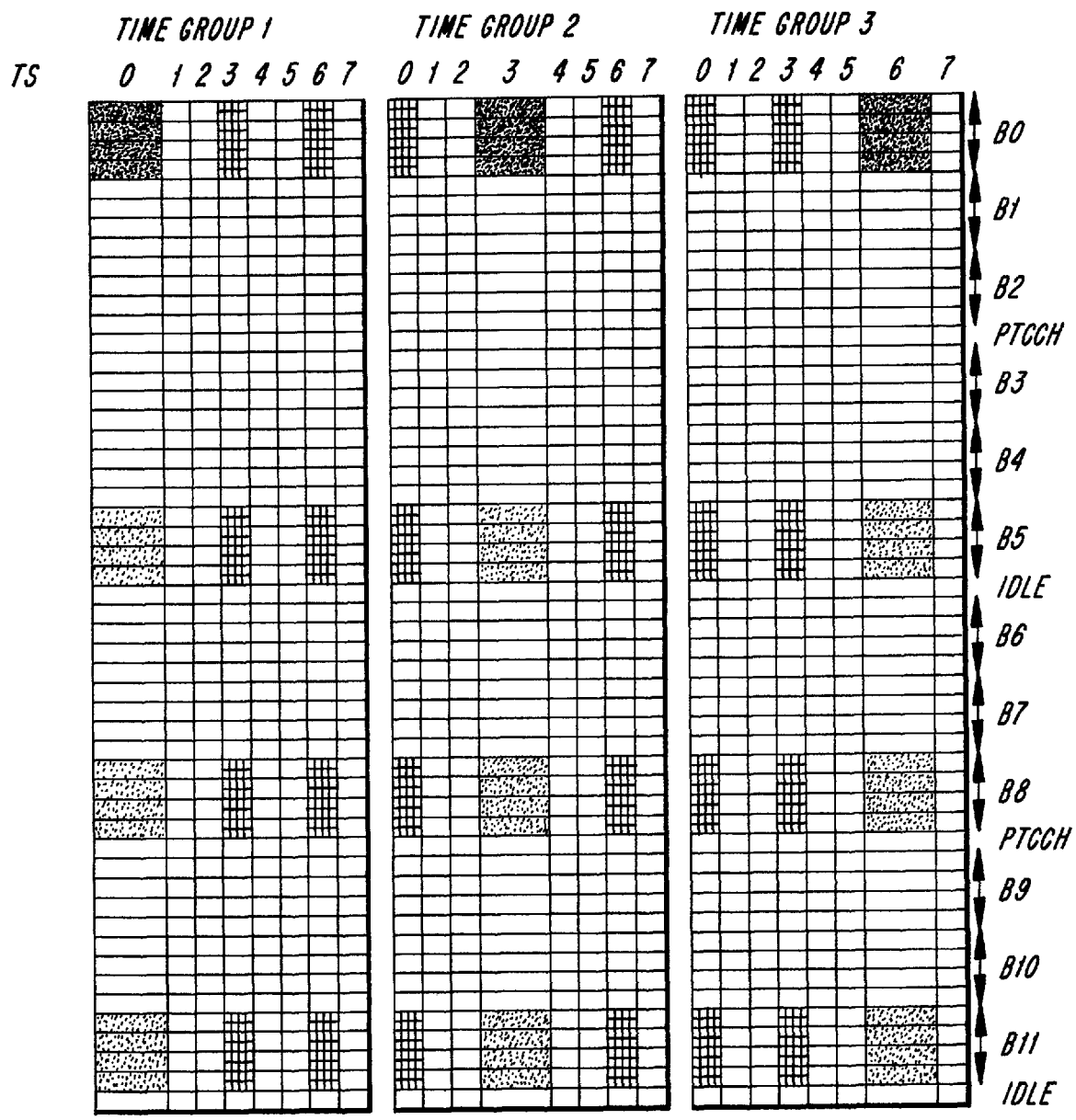
FIG. 3 illustrates a packet control channel allocation pattern in a 52 multiframe structure according to one embodiment of the present invention.

In FIG. 3 is illustrated an exemplary 52 multiframe structure and a distribution of packet common control channels such that a 3/9 reuse according to FIG. 2 can be achieved. In FIG. 3, three different time groups are illustrated. Those are exemplary time groups that could be distributed in a manner similar to that illustrated in FIG. 2. Note that the time groups are only applicable to the TDMA frame blocks and timeslots that are allocated for packet control signalling, i.e., Packet Common Control Channels PCCCH (including PAGCH, PPCH in the downlink and PRACH in the uplink) and Packet Broadcast Channels PBCCH. In Time group 1, 52 TDMA frames 0 . . . 51, including eight timeslots each, are depicted. In the first block ‚B0, consisting of TDMA frames 0 . . . 3 on the first timeslot, TS0, a packet broadcast channel (PBCCH) block is transmitted. In the following four blocks B1 to B4, consisting of TDMA frames 4 . . . 7 and 8 . . . 11, 13 . . . 16 and 17 . . . 20 respectively, no control channel signalling is transmitted. In the following block, 85, TDMA frames 21 . . . 24, a PCCCH block is allocated. TDMA frames 12 and 38 are used for PTCCH, Packet Timing Advance Control Channel, a channel used in GPRS to transfer signalling messages including timing advance information for mobiles sharing the PTCCH on the same physical channel. Following the same reasoning for time group 1, PCCCH blocks are further allocated in block B8 and B11. It should be noted that the PCCCH blocks are shaded in grey and the PBCCH blocks are black in the figure.

In a similar manner for Time group 2, the packet control channel blocks are distributed in the same block numbers but on different time slots. For example, in time group two, the same blocks are used but on timeslot 3 instead and in time group 3, timeslot 6 is used. Of course, other alternatives are possible. It should also be noted that although the number of control channel blocks in this description has been 1 PBCCH block and 3 PCCCH blocks, other combinations are of course possible. For example, 3 PBCCH blocks and 5 PCCCH blocks can be allocated, or actually any combination where the total number of blocks are below or equal to 12.

Figure 4:
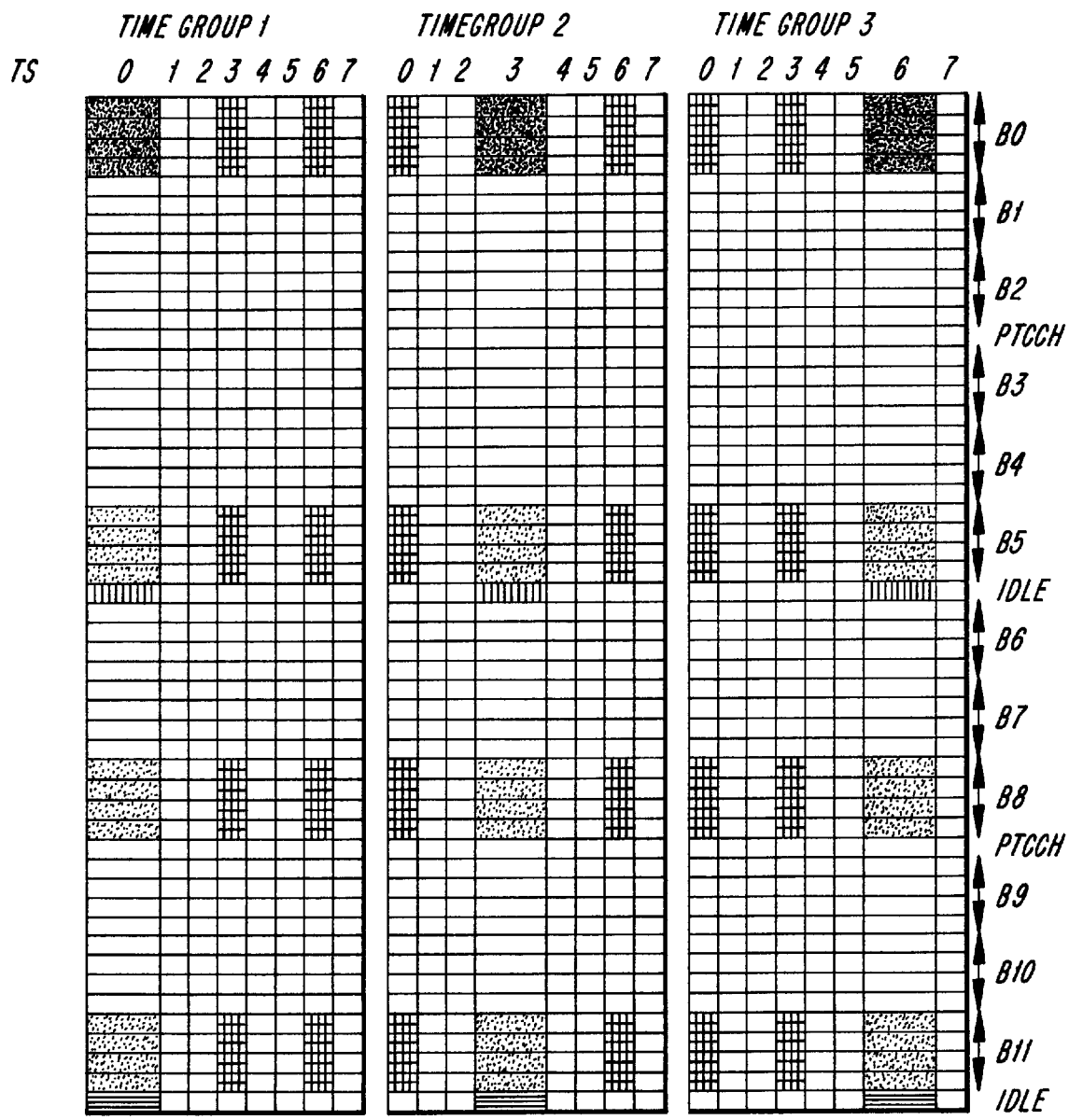
FIG. 4 illustrates a packet control channel allocation pattern in a 52 multiframe, including Packet Synchronization Channel and Packet Frequency Synchronization Channel allocation structure according to one embodiment of the present invention.

In one aspect of the present invention the selection of timeslots to be used for the different time groups, are such that there is at least one timeslot between two time groups. This timeslot can be used for traffic data communication rather than control channel communication. The reason for this is to introduce an additional guard period between the timeslots that are allocated for control channels. This guard period will decrease the risk of having control channel time groups disturbing each other, e.g., due to propagation delays. This allocation strategy will thus introduce less interference in control channel transmissions and a more reliable detection of the control channel information. In FIG. 4, it can be noted that TS 0, TS 3 and TS 6 are used for the different timegroups, leaving at least one timeslot between the different groups.

In another aspect of the present invention, allocation of control channel blocks is considered in another way. The previous strategy of allocating control channel blocks in time groups that are separated with at least one timeslot, as well as the strategy to be described below, aim at obtaining a more reliable detection of control channel messages.

In this aspect of the present invention, traffic channel blocks coinciding in time with control channel blocks in a cell using a different time group, should not be used for traffic. This is illustrated in FIG. 3, by way of checkered timeslots. These are blocks that are not used for control signalling in respective time groups, but rather coincide with blocks that are used for control signalling in other time groups. Restricting usage of these timeslots will minimize interference during the times when the control signalling is transmitted, and the control channels can be managed in a reuse situation that would otherwise not be possible. Thus, it will be possible to reliably introduce packet common control and broadcasting channels with the strategy described in the above aspects of the present invention. More importantly, it will be possible to reliably detect the packet control channels even in a tighter frequency reuse pattern, e.g., a 3/9 frequency reuse pattern.

The discussion so far has been with respect to control channels transmitted in the downlink, from the base station to the mobile station. For example, broadcast messages, paging messages and similar. It should also be noted that the same strategies may also be applied for uplink transmissions, from the mobile station to the base station. In an alternate embodiment of the present invention, the packet random access channel, (PRACH) is allocated on timeslots and blocks in the same way as has been described for the packet control channels in the downlink. This will result in less interference being introduced by the PRACH and also from other traffic. Furthermore, the likelihood that PRACH in different time groups will coincide is decreased with the time slot separation discussed above.

It has been previously discussed above that the packet common control channels in GPRS cannot alone support a GPRS system. The reason for this is that the packet common control channels, as defined today does not allow for any Synchronization Channel (SCH) or Frequency Correction Channel FCCH. The SCH is a logical channel transmitted in the GSM circuit switched control channel structure. It carries information for frame synchronization of the mobile station and identification of a base transceiver station, i.e., a base station. If a GRPS system is to be operated without any circuit switched mode, it would today still require the GSM circuit switched control channels, at least for this reason. The FCCH on the other hand, carries information for frequency correction of the mobile station. This may also be necessary to have in a GPRS system.

If it is possible to overcome these deficiencies and move towards a GPRS system that can run without a GSM circuit switched mode, it will be possible to introduce the GPRS system in other circuit switched system environments. This will also mean that a migration with TDMA/136 as a circuit switched mode and GPRS as a packet switched mode will become more straightforward.

In another aspect of the present invention, a novel technique for introducing synchronization and possibly also frequency correction as packet common control channels is presented. A new synchronization channel called Packet Synchronization Channel (PSCH) is proposed. This channel, PSCH, is allocated on one timeslot in at least one TDMA frame in each 52 multiframe structure. This is illustrated in FIG. 4. Comparing FIG. 4 with FIG. 3, it can be seen in FIG. 4 that in the first idle TDMA frame, TDMA frame 25, the control channel time groups include a new frequency correction channel, a Packet Frequency Correction Channel (PFCCH). This TDMA frame is indicated by vertical stripes. In the second Idle TDMA frame. TDMA frame 51, the Packet Synchronization Channel (PSCH) is introduced. This is indicated by horizontal stripes in the figure. Other possibilities to distribute the PSCH and the PFCCH are of course possible, but will introduce larger steps away from the present definitions of the packet control channel structure in a GPRS 52 multiframe.

One of the difficulties with the present change is that the coding of the frame numbers in the packet synchronization channel, PSCH, cannot be made in the same way as the coding of the frame number in the circuit switched synchronization channel, SCH. In the circuit switched case, a SCH is repeated in a 51 multiframe cycle, whereas in the packet switched case, the PSCH must be repeated in a 52 multiframe cycle.

Figure 5B:
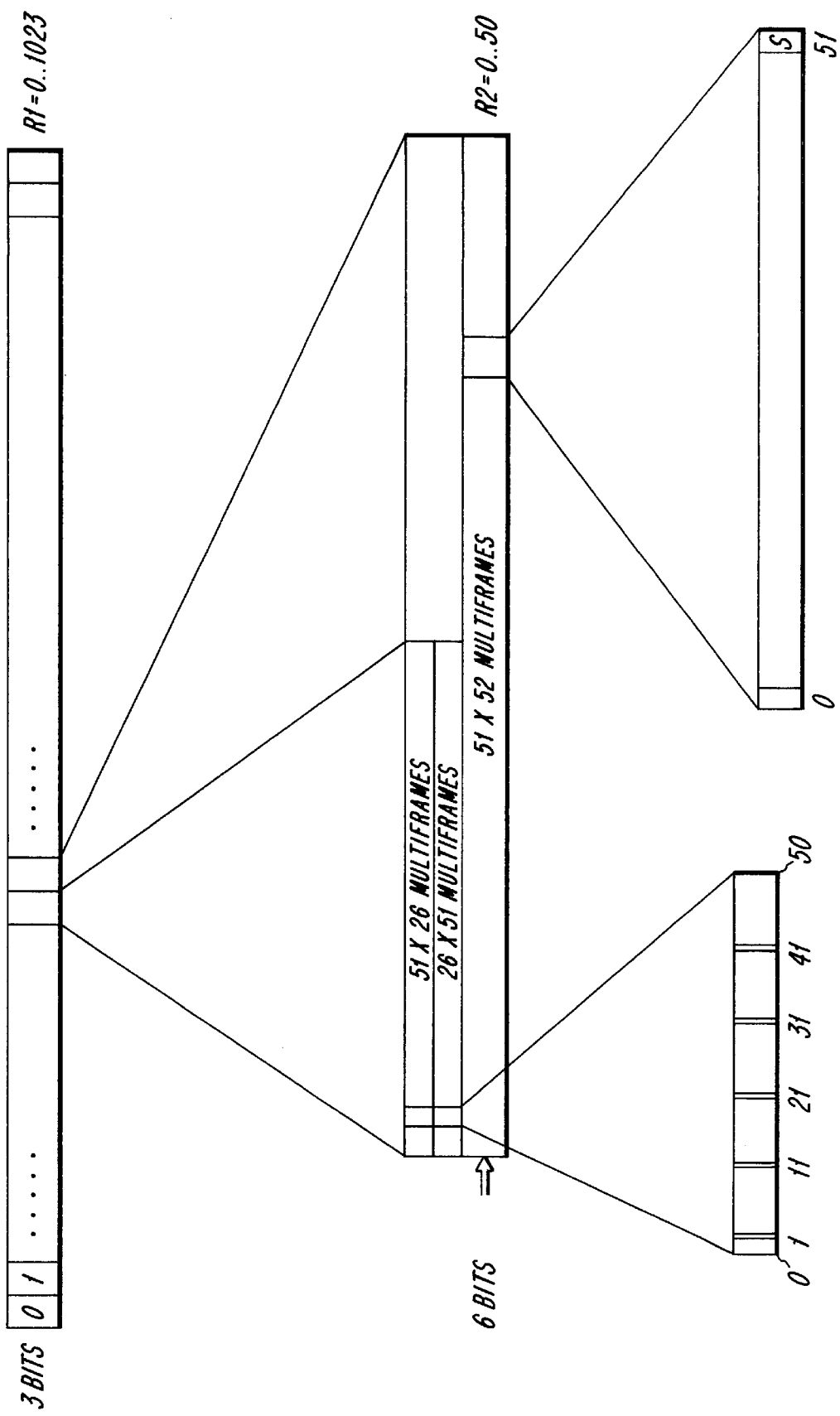
FIG. 5b illustrates a new coding of a Packet Synchronization Channel according to one embodiment of the present invention.
Figure 6:
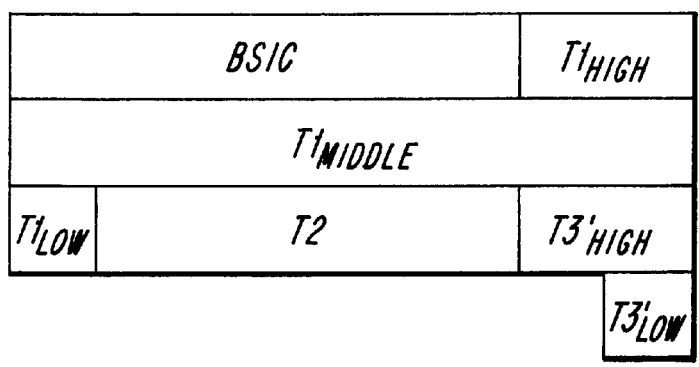
FIG. 6 illustrates Synchronization Channel format for GSM circuit switched control channels.

In FIG. 5a and FIG. 6, is illustrated the 51 and 52 multiframe structures as defined in the present ETSI GSM specifications. The longest TDMA frame cycle consists of 2 715 648 TDMA frames divided in superframes consisting of twenty-six 51 TDMA frames, or fifty-one 26 TDMA frames. The frame number coding in the present SCH is such that 11 bits are used to indicate the superframe number, 0 . . . 2047, 5 bits are used to indicate the twenty-six 51 TDMA frames and further 3 bits; are used to indicate the synchronization burst position. In a 51 multiframe there are 5 synchronization bursts, located in TDMA frame number 1, 11, 21, 31 and 41. This coding is illustrated in FIG. 6. A base station identity code, BSIC, is included in each SCH transmission. Further 2+8+1 bits are included for coding the superframe phase, T1, 5 bits to code the 51 multiframe number, T2, and 3 bits to code the position of the SCH burst in a 51 multiframe, T3, i.e., TDMA frame number 1, 11, 21, 31 or 41.

Figure 7:
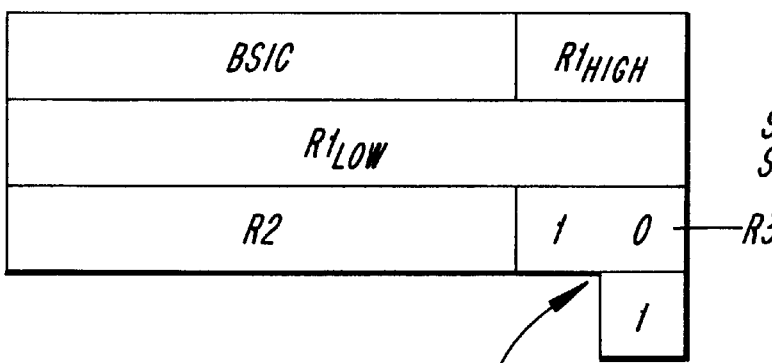
FIG. 7 illustrates Packet Synchronization Channel format according to one embodiment of the present invention.

In one embodiment of the present invention a 52 multiframe will only include one position for PSCH. The novel suggested coding of this is illustrated in FIG. 5b and FIG. 7.

The same base station identity code, BSIC will be used as before. In the PSCH, 10 bits will be used to code a superframe phase including fifty-one 52 multiframes, R1. 6 bits will be used to indicate the 52 multiframe number in a superframe, R2. Following 3 bits, R3 will be coded such that it differs from the coding of the T3 bits in the present SCH. This is done to indicate that coding of the frame number follows a 52 multiframe structure and not a 51 multiframe structure, i.e., to indicate that the message actually is a PSCH and not an SCH. This is possible to do since the three T3 bits only has five values in the SCH, but could in theory represent eight different values, i.e., $2^3$. If the last three bits are coded as one of the three values not used in T3 bits in the SCH, then a mobile station decoding such a message will immediately know that it is listening to a 52 multiframe PSCH. In one embodiment, only one PSCH is transmitted and the position thereof is then inherently given in alternate embodiments it is possible to introduce more than one PSCH in a 52 multiframe structure, in which case it can be possible to use another of the three values, not used in T3 coding in SCH, to represent this constellation. Since there are three values that are not used for T3, then R3 can tale three unique values that both indicate the position of the PSCH, possibly in a combination with PFCCH, shifted a number of TDMA frames from the position of PSCH. It may also indicate the number of times a PSCH is transmitted in a 52 multiframe.

For example, in a circuit switched GSM SCH, the T3 bits can only take the values 0 . . . 4. Coding the corresponding bits on the PSCH, R3, as the value. 5 (101) may mean that it is a transmission of a PSCH rather than a SCH. The value 5 could further mean that there is one occurrence of PSCH on TDMA frame 51 and one occurrence of a PFCCH on TDMA frame 25. This case is illustrated in FIG. 7. This is of course exemplary, other possibilities can equally well be represented with the values not used, e.g., two packet synchronization occurrences.

The steps taken above in the different aspects of the present invention are all introduced to be able to run a GPRS system without also having to allocate channel resources for a circuit switched GSM control channel. This will increasingly ease the migration of GPRS packet data mode in other circuit switched environments than GSM, e.g., TDMA/136 circuit switched systems. It will further make it possible to run GPRS in a tight frequency reuse pattern, even without any circuit switched mode at all.

Figure 8:
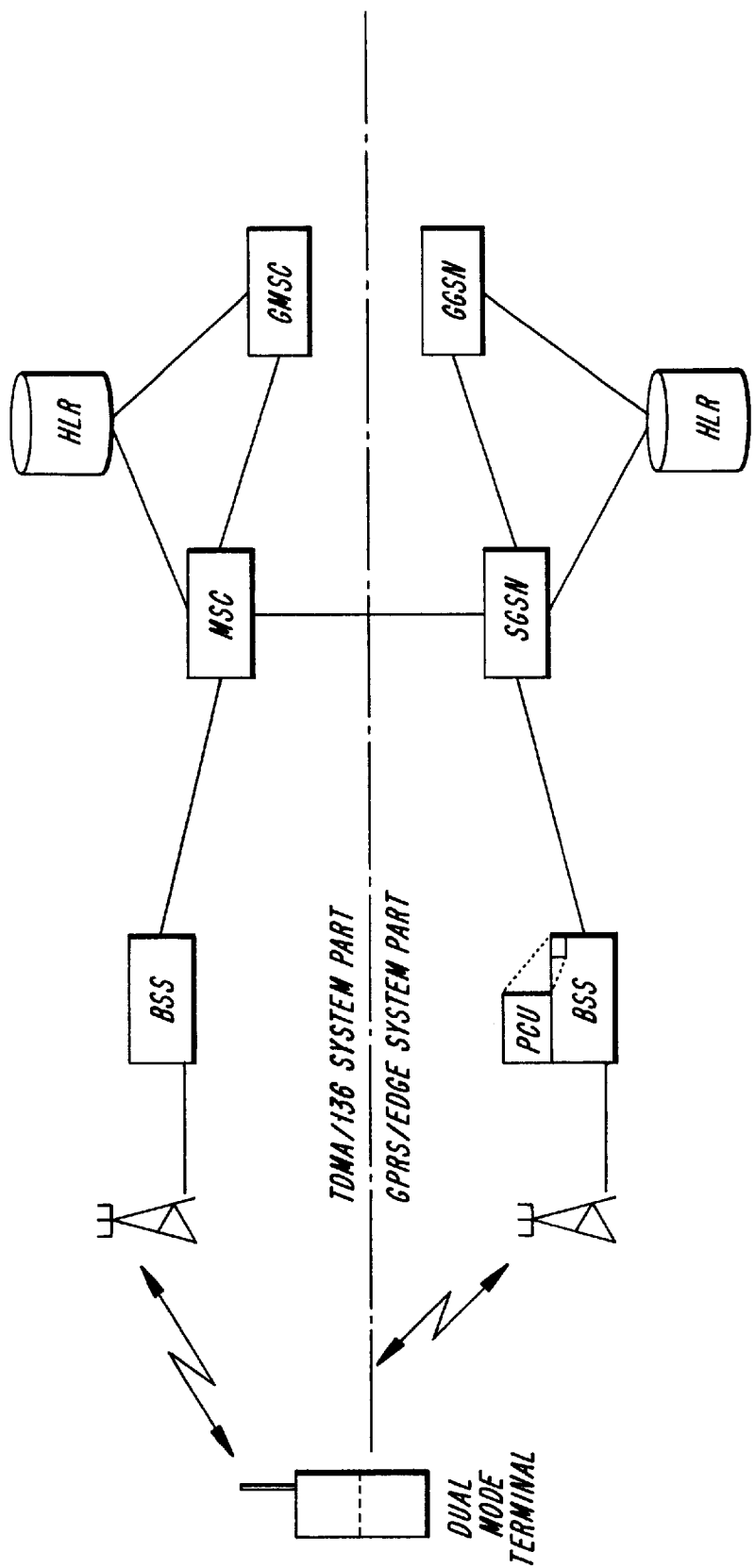
FIG. 8 illustrates a GPRS system integrated with a TDMA/136 system according to different embodiments of the present invention.

In FIG. 8 is illustrated a possible network overview for the migration of GPRS and TDMA/1 36. It should be noted that the illustration is of a logical nature rather than a physical, and that several of the functional nodes in, the TDMA/136 mode or system part may well be co-located or integrated with the functional nodes in the GPRS mode or system part. Specifically in FIG. 8, is illustrated a packet control unit (PCU), that handles the allocation of certain channels to certain time groups and timeslots. This packet control unit may be located in different nodes, e.g., as shown in the figure, in the base station subsystem, BSS.

It should of course also be noted that the above strategies may be applicable to other systems than a pure GPRS system. Specifically, this invention is readily applicable to the extensions of GPRS with a higher level modulation.

The reuse pattern illustrated for the control channels in the different embodiments of the present invention is a 3/9 reuse pattern. There are of course variations of this as well. An additional time group may be allocated for control channel signalling, such that there are four different time groups, each separated by one timeslot. This will further increase the frequency and timeslot reuse pattern to a 4/12 reuse pattern, i.e., 12 different physical channels are allocated such that for four base station sites, each base station site transmit on all the frequencies but in different time groups.

The timeslot numbering used to describe the present invention is exemplary and it should be recognized to someone skilled in the art that in fact, all control channel signalling can take place in TS0. If the time synchronization between the base station sites is such that TS0 in one site coincides with, e.g., TS2 in another base station site etc the effects will be the same.

For purposes of explanation, control channels have been allocated to different sites.

Although the present invention have been described with examples from a packet switched communication system compliant to the GPRS/GSM standard specification, it should be noted that the solutions presented may be equally well applicable to any other packet switched data communication system. The specific embodiments should therefore be considered exemplary rather than limiting the scope of the invention.

The invention should be rather be defined by the following claims.

What is claimed is:

1. A cellular communications system comprising at least one base station site synchronized system part, including a packet switched mode, wherein packet control channels are allocated on physical channels, consisting of a combination of frequency and at least one time slot, and wherein said physical channels carrying packet control signalling are arranged in a reuse pattern, such that both frequency and timeslot are utilized in said reuse pattern, comprising;

means for allocating, in a first base station site, said control channel signalling to a certain set of physical channels on at least one frequency and a certain time group, defined by at least one timeslot, means for allocating, in a second base station site, said control channel signalling to a certain set of physical channels on said at least one frequency and a certain time group, defined by at least one timeslot, wherein said time group used in said second base station site is defined to be non-simultaneous in transmission to said time group used in said first base station site, means for preventing, in said second base station site, the allocation of user data channels on physical channels that substantially coincide in time and frequency with physical channels allocated for control channel signalling in said first base station site.

2. The system of claim 1, wherein said synchronized system part transmits information over the air on 200 kHz carriers, each carrier being divided into 8 timeslots.

3. The system of claim 1, wherein, for the synchronized system part, control signalling allocation in a substantial communication coverage region is done on three 200 kHz carriers in a 1/3 frequency reuse pattern and an overlaid 1/3 time group reuse pattern, creating 9 groups of physical channels, each group being defined by a frequency and at least one timeslot.

4. The system of claim 1, wherein user data traffic is transmitted on physical channels arranged in a 1/3 reuse pattern.

5. The system of claim 1, wherein, for the synchronized system part, control signalling allocation in a substantial communication coverage region is done on three 200 kHz carriers in a 1/3 frequency reuse pattern and an overlaid 1/4 time group reuse pattern, creating 12 groups of physical channels, each group being defined by a frequency and at least one timeslot.

6. A cellular communications system comprising at least one base station site synchronized system part, including a packet switched mode, wherein packet control channels are allocated on physical channels consisting of a combination of frequency and at least one time slot, and wherein said physical channels carrying packet control signalling are arranged in a reuse pattern, such that both frequency and timeslot are utilized in said reuse pattern, comprising;

means for allocating, in a first base station site, said control channel signalling to a certain set of physical channels on at least one frequency and a certain time group, defined by at least one timeslot, means for allocating, in a second base station site, said control channel signalling to a certain set of physical channels on said at least one frequency and a certain time group, defined by at least one timeslot, wherein said time group used in said second base station site is defined to be non-simultaneous in transmission to said time group used in said first base station site and wherein the transmission is separated in time corresponding to at least one timeslot.

7. The system of claim 6, wherein said synchronized system part transmits information over the air on 200 kHz carriers, each carrier being divided into 8 timeslots.

8. The system of claim 6, wherein, for the synchronized system part, control signalling allocation in a substantial communication coverage region is done on three 200 kHz carriers in a 1/3 frequency reuse pattern and an overlaid 1/3 time group reuse pattern, creating 9 groups of physical channels, each group being defined by a frequency and at least one timeslot.

9. The system of claim 6, wherein user data traffic is transmitted on physical channels arranged in a 1/3 reuse pattern.

10. The system of claim 6, wherein, for the synchronized system part, control signalling allocation in a substantial communication coverage region is done on three 200 kHz carriers in a 1/3 frequency reuse pattern and an overlaid 1/4 time group reuse pattern, creating 12 groups of physical channels, each group being defined by a frequency and at least one timeslot.

11. A method in a cellular communications system comprising at least one base station site synchronized system part, including a packet switched mode, where packet control channels are allocated on physical channels consisting of a combination of frequency and at least one time slot, wherein said physical channels carrying packet control signalling are arranged in a reuse pattern, such that both frequency and timeslot are utilized in said reuse pattern, said method comprising the steps of;

allocating in a first base station site, said control channel signaling to a certain set of physical channels on at least one frequency and a certain time group, defined by at least one timeslot, allocating in a second base station site, said control channel signalling to a certain set of physical channels on said at least one frequency and a certain time group, defined by at least one timeslot, where said time group used in said second base station site is defined to be non-simultaneous in transmission to said time group used in said first base station site, preventing the allocation of user data channels on physical channels that substantially coincide in time and frequency, with physical channels allocated for control channel signalling in said first base station site.

12. A method in a cellular communications system comprising at least one base station site synchronized system part, including a packet switched code, wherein packet control channels are allocated on physical channels consisting of a combination of frequency and at least one time slot, and wherein said physical channels carrying packet control signalling are arranged in a reuse pattern, such that both frequency and timeslot are utilized in said reuse pattern, said method further comprising the steps of;

allocating in a first base station site, said control channel signalling to a certain set of physical channels on at least one frequency and a certain time group, defined by at least one timeslot, allocating in a second base station site, said control channel signalling to a certain set of physical channels on said at least one frequency and a certain time group, defined by at least one timeslot, wherein said time group used in said second base station site is defined to be non-simultaneous in transmission to said time group used in said first base station site and wherein the transmission is separated in time corresponding to at least one timeslot.

\* \* \* \* \*